(12) United States Patent
Nelson et al.

(10) Patent No.: US 10,947,162 B2
(45) Date of Patent: Mar. 16, 2021

(54) BRAZE ALLOYS FOR JOINING OR REPAIRING CERAMIC MATRIX COMPOSITE (CMC) COMPONENTS

(71) Applicants: Rolls-Royce Corporation, Indianapolis, IN (US); Trustees of the Colorado School of Mines, Golden, CO (US)

(72) Inventors: Scott Nelson, Carmel, IN (US); Raymond Xu, Carmel, IN (US); Sean Landwehr, Avon, IN (US); Juan Wei, Lakewood, CO (US); Stephen Liu, Golden, CO (US); Juan Carlos Madeni, Littleton, CO (US)

(73) Assignees: ROLLS-ROYCE CORPORATION, Indianapolis, IN (US); TRUSTEES OF THE COLORADO SCHOOL OF MINES, Golden, CO (US)

( * ) Notice: Subject to any disclaimer, the term of this patent is extended or adjusted under 35 U.S.C. 154(b) by 530 days.

(21) Appl. No.: 15/951,707

(22) Filed: Apr. 12, 2018

(65) Prior Publication Data
US 2019/0031570 A1    Jan. 31, 2019

Related U.S. Application Data

(60) Provisional application No. 62/485,163, filed on Apr. 13, 2017.

(51) Int. Cl.
*B23K 35/00* (2006.01)
*C04B 37/00* (2006.01)
*B23K 35/30* (2006.01)

(52) U.S. Cl.
CPC ........... *C04B 37/003* (2013.01); *B23K 35/30* (2013.01); *C04B 37/006* (2013.01);
(Continued)

(58) Field of Classification Search
CPC ........... C04B 41/4523; C04B 41/5066; C04B 2237/08; C04B 2237/708; C04B 41/5024; C04B 41/5071; C04B 2235/5244; C04B 2235/5256; C04B 2235/6567; C04B 2235/6581; C04B 2237/123; C04B 2237/128; C04B 2237/341; C04B 2237/363; C04B 35/00; C04B 35/10; C04B 35/14; C04B 35/18; C04B 35/584; C04B 37/003; C04B 37/005; C04B 41/48; C04B 41/5001; C04B 41/5035; C04B 41/51;
(Continued)

(56) References Cited

U.S. PATENT DOCUMENTS 3,813,759 A    6/1974   Heap et al.
4,499,360 A    2/1985   Rottenbacher
(Continued)

FOREIGN PATENT DOCUMENTS

WO    WO 2013/089869 A2    6/2013

*Primary Examiner* — Erin B Saad
(74) *Attorney, Agent, or Firm* — Brinks Gilson & Lione (57) ABSTRACT

A braze alloy for joining or repairing ceramic matrix composite (CMC) components comprises a braze composition including silicon at a concentration from about 48 at. % to about 66 at. %, titanium at a concentration from about 1 at. % to about 35 at. %, and an additional element selected from aluminum, cobalt, vanadium, nickel, and chromium. The braze composition comprises a melting temperature of less than 1300° C.

16 Claims, 10 Drawing Sheets

(52) U.S. Cl.
CPC ...... *C04B 2237/08* (2013.01); *C04B 2237/16* (2013.01); *C04B 2237/365* (2013.01); *C04B 2237/38* (2013.01); *C04B 2237/60* (2013.01)

(58) Field of Classification Search
CPC ........... C04B 41/89; C04B 2111/00844; C04B 2235/3206; C04B 2235/3213; C04B 2235/3217; C04B 2235/3224; C04B 2235/3225; C04B 2235/3227; C04B 2235/3232; C04B 2235/3244; C04B 2235/3251; C04B 2235/3256; C04B 2235/3279; C04B 2235/3418; C04B 2235/3826; C04B 2235/3873; C04B 2235/3891; C04B 2235/40; C04B 2235/404; C04B 2235/422; C04B 2235/428; C04B 2235/483; C04B 2235/5248; C04B 2235/604; C04B 2235/612; C04B 2235/614; C04B 2235/616; C04B 2235/6562; C04B 2235/6565; C04B 2235/658; C04B 2235/661; C04B 2235/666; C04B 2235/80; C04B 2235/96; C04B 2235/9607; C04B 2235/9684; C04B 2237/12; C04B 2237/121; C04B 2237/122; C04B 2237/125; C04B 2237/127; C04B 2237/343; C04B 2237/345; C04B 2237/348; C04B 2237/368; C04B 2237/52; C04B 2237/597; C04B 2237/60; C04B 2237/704; C04B 2237/765; C04B 2237/80; C04B 2237/84; C04B 2237/86; C04B 2237/88; C04B 35/495; C04B 35/571; C04B 35/58085; C04B 35/58092; C04B 35/62868; C04B 35/62873; C04B 35/62884; C04B 35/62894; C04B 35/62897; C04B 35/64; C04B 35/71; C04B 35/80; C04B 37/008; C04B 41/5045; C04B 41/87; B23K 35/30; B23K 1/19; B23K 35/0244; B23K 35/32; B23K 1/0008; B23K 2103/52; B23K 35/24; B23K 35/325; B23K 1/0006; B23K 1/0018; B23K 1/002; B23K 1/0056; B23K 1/20; B23K 2035/008; B23K 2103/08; B23K 35/001; B23K 35/02; B23K 35/0222; B23K 35/0238; B23K 35/025; B23K 35/28; B23K 35/3006; B23K 35/327; B23K 35/36; B23K 35/3612; B23K 35/3613; B23K 3/0607

See application file for complete search history.

(56) References Cited

U.S. PATENT DOCUMENTS

| | | |
|---|---|---|
| 4,711,971 A | 12/1987 | Duncan et al. |
| 4,784,313 A | 11/1988 | Godziemba |
| 4,830,820 A | 5/1989 | Itoh et al. |
| 4,851,299 A | 7/1989 | Godziemba-Maliszewski |
| 4,961,529 A | 10/1990 | Gottselig et al. |
| 5,203,488 A | 4/1993 | Wang et al. |
| 5,447,683 A | 9/1995 | Montgomery et al. |
| 5,705,280 A | 1/1998 | Doty |
| 5,732,468 A | 3/1998 | Galley et al. |
| 5,836,505 A | 11/1998 | Chaumat et al. |
| 5,975,407 A | 11/1999 | Gasse et al. |
| 6,221,499 B1 | 4/2001 | Gasse et al. |
| 6,397,581 B1 | 6/2002 | Vidal et al. |
| 6,692,586 B2 | 2/2004 | Xu et al. |
| 6,884,030 B2 | 4/2005 | Darkins et al. |
| 7,115,319 B2 | 10/2006 | Raybould et al. |
| 7,222,775 B2 | 5/2007 | Chaumat et al. |
| 7,318,547 B2 | 1/2008 | Gasse |
| 7,360,988 B2 | 4/2008 | Lee et al. |
| 7,478,742 B2 | 1/2009 | Beyer et al. |
| 7,748,956 B2 | 7/2010 | Paulino et al. |
| 7,794,201 B2 | 9/2010 | Burton et al. |
| 7,874,059 B2 | 1/2011 | Morrison et al. |
| 8,047,771 B2 | 11/2011 | Tucker et al. |
| 9,056,369 B2 | 6/2015 | Chaumat |
| 9,624,786 B2 | 4/2017 | Xu et al. |
| 2003/0049154 A1* | 3/2003 | Xu .......... B23K 35/32 420/417 |
| 2004/0120813 A1 | 6/2004 | Couture et al. |
| 2007/0084051 A1 | 4/2007 | Tomoko et al. |
| 2008/0087710 A1 | 4/2008 | Glaeser |
| 2008/0190552 A1 | 8/2008 | Bouillon et al. |
| 2009/0266870 A1 | 10/2009 | Yousefiani et al. |
| 2010/0126018 A1 | 5/2010 | Headley et al. |
| 2012/0177488 A1 | 7/2012 | Corman |
| 2013/0004235 A1* | 1/2013 | Chaumat ................ B23K 35/02 403/272 |
| 2013/0075039 A1 | 3/2013 | Herderick et al. |
| 2014/0030076 A1* | 1/2014 | Nunez ................... B29C 70/222 415/183 |
| 2014/0271144 A1 | 9/2014 | Landwehr et al. |
| 2015/0165536 A1* | 6/2015 | Chaumat ............ B23K 35/0244 428/408 |
| 2016/0145159 A1* | 5/2016 | Landwehr ................ F01D 5/288 428/448 |

\* cited by examiner

BRAZE ALLOYS FOR JOINING OR REPAIRING CERAMIC MATRIX COMPOSITE (CMC) COMPONENTS

RELATED APPLICATION

The present disclosure claims the benefit of priority under 35 U.S.C. 119(e) to U.S. Provisional Patent Application Ser. No. 62/485,163, filed on Apr. 13, 2017, which is hereby incorporated by reference in its entirety.

TECHNICAL FIELD

The present disclosure relates generally to a braze alloy, and more specifically to a braze alloy for joining or repairing components used in gas turbine engines.

BACKGROUND

Ceramic matrix composites (CMCs) may be used in aerospace engine applications because of their mechanical properties and chemical stability at high temperatures. Various components of gas turbine engines, such as blades and vanes, can be manufactured from CMCs, such as silicon carbide (SiC) fiber-reinforced SiC matrix (SiC/SiC) composites.

Coupling together two or more components made of CMCs can be challenging. Traditionally-used braze alloys based on nickel and/or gold may exhibit undesirably low melting temperatures and/or have a tendency to form low-melting point eutectic phases in braze joints and areas adjacent to the braze joints due reactions with free silicon in the CMC component. For example, a gold-based braze alloy may interact with free silicon during brazing to form a gold-silicon eutectic phase that has a melting temperature of about 360° C. The resulting braze joint and surrounding areas may then be susceptible to failure and oxidation at high temperatures in use. As a result, such braze joints may not be suitable in high temperature sections of gas turbine engines.

A challenge with brazing alloys designed for high temperature applications is that the brazing temperature may be close to the melting point of silicon in the CMC matrix. For example, the brazing temperature of a current high temperature braze alloy is about 1375° C., which is only 39° C. below the melting point of silicon. A brazing cycle at 1375° C. has the potential of jeopardizing the microstructural integrity and mechanical strength of the CMC.

It would advantageous to be able to carry out the brazing of CMC components at lower temperatures without sacrificing the mechanical properties and high temperature stability of the brazed joint.

BRIEF SUMMARY

A braze alloy for joining ceramic matrix composites comprises a braze composition including silicon at a concentration from about 48 at. % to about 66 at. %, titanium at a concentration from about 1 at. % to about 35 at. %, and an additional element selected from aluminum, cobalt, vanadium, nickel, and chromium. The braze composition has a melting temperature of less than 1300° C. Preferably, the melting temperature is at least about 1150° C. The braze alloy may be used to bond together ceramic matrix composite (CMC) components employed in gas turbine engines.

A method of joining ceramic matrix composites comprises placing a braze alloy having a melting temperature less than 1300° C. adjacent to and/or between first and second components, where at least one of the first and second components comprises a ceramic matrix composite, and heating the braze alloy to a predetermined brazing temperature, which is equal to or greater than a melting temperature thereof. After the heating, the braze alloy is cooled to form a brazed joint between the first component and the second component. The braze alloy has a braze composition comprising silicon at a concentration from about 48 at. % to about 66 at. %, titanium at a concentration from about 1 at. % to about 35 at. %, and an additional element selected from the group consisting of: aluminum, cobalt, vanadium, nickel, and chromium.

DETAILED DESCRIPTION

Braze alloys designed for brazing high temperature components such as SiC/SiC ceramic matrix composites (CMC) have been developed. The new braze alloys melt at lower temperatures than previous generations of high temperature braze alloys, yet result in brazed joints with high joint strengths and good stability during elevated temperature use. In addition, the new braze alloys exhibit good flow properties and wettability with CMCs and may be useful with other materials, such as metals. Initial studies indicate that reactions between the braze alloy and the CMC during brazing lead to stable phases that do not detrimentally affect the mechanical properties of the brazed joint. For example, brazed joints fabricated using the new braze alloys exhibit high shear strengths.

Suitable braze alloys may have a braze composition including silicon at a concentration from about 48 atomic percent (at. %) to about 66 at. %, titanium at a concentration from about 1 at. % to about 35 at. %, and one or more additional elements selected from among aluminum, cobalt, vanadium, nickel, and chromium. The additional element(s) may account for the balance of the braze composition, except for any incidental impurities. The melting temperature of the braze composition is less than 1300° C. Preferably, the melting temperature is at least about 1150° C.

The braze composition may be a silicon-rich alloy that includes either aluminum, cobalt or titanium in an amount ranging from about 27 at. % to about 36 at. %. Generally speaking, the braze composition may comprise silicon as the primary constituent in terms of concentration, with either aluminum, cobalt or titanium as the secondary constituent. Three exemplary braze compositions having reduced melting temperatures are identified in Table 1. Suitable brazing temperature ranges for the braze compositions are also proposed. Typically, brazing is carried out at a temperature ("brazing temperature") higher than the melting temperature of the braze composition. For example, the brazing temperature may be at least 40° C. higher than the melting temperature, or at least 80° C. higher than the melting temperature. The brazing temperature may also be up to 100° C. higher than the melting temperature, or up to 140° C. higher than the melting temperature.

TABLE 1

Braze Compositions with Reducing Melting Temperatures

| Braze Composition | Element | Composition Range (at. %) | Melting Temperature (° C.) | Brazing Temperature (° C.) |
|---|---|---|---|---|
| (1) Si—Al—Ti | Si | 60-66 | 1150-1185 | 1210-1310 |
|  | Al | 32-36 |  |  |
|  | Ti | 2-4 |  |  |
| (2) Si—Co—V—Ti | Si | 59-63 | 1225-1260 | 1280-1335 |
|  | Co | 27-30 |  |  |
|  | V | 7-10 |  |  |
|  | Ti | 1-3 |  |  |
| (3) Si—Ti—Ni—Co—Cr | Si | 48-52 | 1270-1295 | 1310-1350 |
|  | Ti | 29-35 |  |  |
|  | Ni | 7-11 |  |  |
|  | Co | 4-6 |  |  |
|  | Cr | 3-6 |  |  |

Referring to Table 1, the braze composition may include silicon, titanium and aluminum. Alternatively, the braze composition may include silicon, titanium, cobalt and vanadium, or the braze composition may include silicon, titanium, nickel, cobalt and chromium.

In a first example, the braze composition may include aluminum at a concentration from about 32 at. % to about 36 at. %. The concentration of silicon may be from about 60 at. % to about 66 at. %, and the concentration of titanium may be from about 2 at. % to about 4 at. %. The melting temperature may lie in a range from about 1150° C. to about 1185° C. In one particular example, the braze composition may comprise 63 at. % Si, 34 at. % Al and 3 at. % Ti.

In a second example, the braze composition may include cobalt at a concentration from about 27 at. % to about 30 at. %. The concentration of silicon may be from about 59 at. % to about 63 at. %, and the concentration of titanium may be from about 1 at. % to about 3 at. %. The braze composition may further comprise vanadium at a concentration of from about 7 at. % to about 10 at. %. The melting temperature may lie in a range from about 1225° C. to about 1260° C. In one particular example, the braze composition may comprise 61 at. % Si, 29 at. % Co, 8 at. % V and 2 at. % Ti.

In a third example, the braze composition may include titanium at a concentration from about 29 at. % to about 35 at. %, and the concentration of silicon may be from about 48 at. % to about 52 at. %. The braze composition may further comprise nickel at a concentration from 7 at. % to about 11 at. %, cobalt at a concentration from about 4 at. % to about 6 at. %, and chromium at a concentration of from about 3 at. % to about 6 at. %. The melting temperature may lie in a range from about 1270° C. to about 1295° C. In one particular example, the braze composition may comprise 50 at. % Si, 32 at. % Ti, 9 at. % Ni, 5 at. % Co and 4 at. % Cr.

The braze alloy may include one or more of the three exemplary braze compositions described above and in Table 1. When the braze alloy includes two or more of the exemplary braze compositions, a suitable braze temperature may be selected based on the braze temperature ranges provided in the table in view of the proportion of each braze composition included in the braze alloy. Suitable proportions in the braze alloy may be, for example, at least about 30 wt. % or at least 50 wt. % of one of the braze compositions, and no more than about 70 wt. % or no more than about 50 wt. % of another of the braze compositions. In some cases, the braze alloy may also or alternatively include added constituents, such as silicon or another element or alloy in combination with the first, second and/or third exemplary braze composition(s). For example, the braze alloy may include at least about 50 wt. % or at least about 70 wt. % of the one or more of the exemplary braze compositions described in this disclosure, with the balance of the braze alloy (e.g., about 50 wt. % or less, or about 30 wt. % or less) being the added constituent, such as silicon.

The braze composition may include, particularly once brazing has been carried out, at least one silicide phase, such as, for example, $TiSi_2$, $CoSi_2$, $VSi_2$, $(Ni,Co)Si_2$, $(Ti,Cr)Si_2$, and/or $Ti_4Ni_4Si_7$. Such phases may be thermally stable and nonreactive with the CMC and may lead to good mechanical properties of the brazed joint. For example, a braze alloy comprising 63 at. % Si, 34 at. % Al and 3 at. % Ti as described above may include $TiSi_2$ in the form of a small, cellular phase. Based on initial testing, the apparent shear strength of a brazed joint comprising this braze alloy is 35 MPa, nearly six times higher than that measured for a previously developed 75 wt. % Si-25 wt. % Ti alloy (85.3 at. % Si-14.7 at. % Ti alloy).

As an example of a method of using the braze alloy, the braze alloy may be employed to join a first component to a second component, where each component comprises a ceramic matrix composite, such as a SiC/SiC composite, or another material, such as a metal. Thus, the braze alloy may be employed to bond a CMC to a CMC, or a CMC to another material, such as a metal. The braze alloy may be used in the form of a rod, ribbon, wire, powder, paste or slurry. The braze alloy, which comprises a braze composition having any of the characteristics described in this disclosure, may be placed adjacent to and/or between the first and second components, either prior to heating or during the heating process. The braze alloy is then heated to the desired brazing temperature, which, as explained above, is typically higher than the melting temperature of the braze composition. Typically, the brazing temperature lies in a range from about 1210° C. to about 1350° C. The braze alloy may be maintained at the desired brazing temperature for a predetermined amount of time, followed by cooling, typically to room temperature, in order to form a solidified brazed joint between the first component and the second component. The brazed joint may include any of the silicide phases set forth above. In some cases, after brazing, the brazed joint may be subjected to a diffusion heat treatment at a suitable temperature, such as between about 1090° C. and about 1315° C.

A thermodynamic and microstructural analysis of the exemplary braze alloy systems proposed in this disclosure (Si—Al—Ti, Si—Co—V—Ti, and Si—Ti—Ni—Co—Cr) is carried out using thermodynamic modeling software (Thermo-Calc), scanning electron microscopy (SEM) and energy dispersive spectroscopy (EDS). The braze alloys can be fabricated by melting raw material stock (e.g., metal powders or chunks) in the appropriate composition ratios in an arc button melter or other melting apparatus. Liquidus (melting) and brazing temperatures are determined from the thermodynamic analysis as well as actual melting and brazing experiments, and are summarized in Table 1 above.

Thermodynamic modeling results for the Si—Al—Ti system are shown in FIGS. 1A-1D, with Al additions to the Si—Ti system of 10 at. %, 20 at. %, 30 at. %, and 35 at. %, respectively. As the Al content increases in the Ti—Si system, the liquidus temperature (or melting point) decreases from 1285° C. to 1163° C., as indicated in the phase diagrams. As temperature decreases, the Ti—Si eutectic structure forms in the system once the temperature reaches the eutectic temperature (dashed line). After that, the Ti—Si eutectic continues to form until the temperature reaches 577° C. A suitable braze composition determined by thermodynamic modelling is 3 Ti-35 Al-62 Si (in at. %) or 5.08 Ti-33.39 Al-61.53 Si (in wt. %). According to the thermodynamic analysis, phases present in the braze composition include silicon (diamond structure), aluminum and $TiSi_2$. The presence of silicon, aluminum, $TiSi_2$ and Al—Si eutectic is verified by EDS and SEM. Silicon is found to take the form of a coarse columnar phase, $TiSi_2$ is present as a small cellular phase, and the Al—Si eutectic structure can be found between the coarse silicon phases.

Figure 1A:
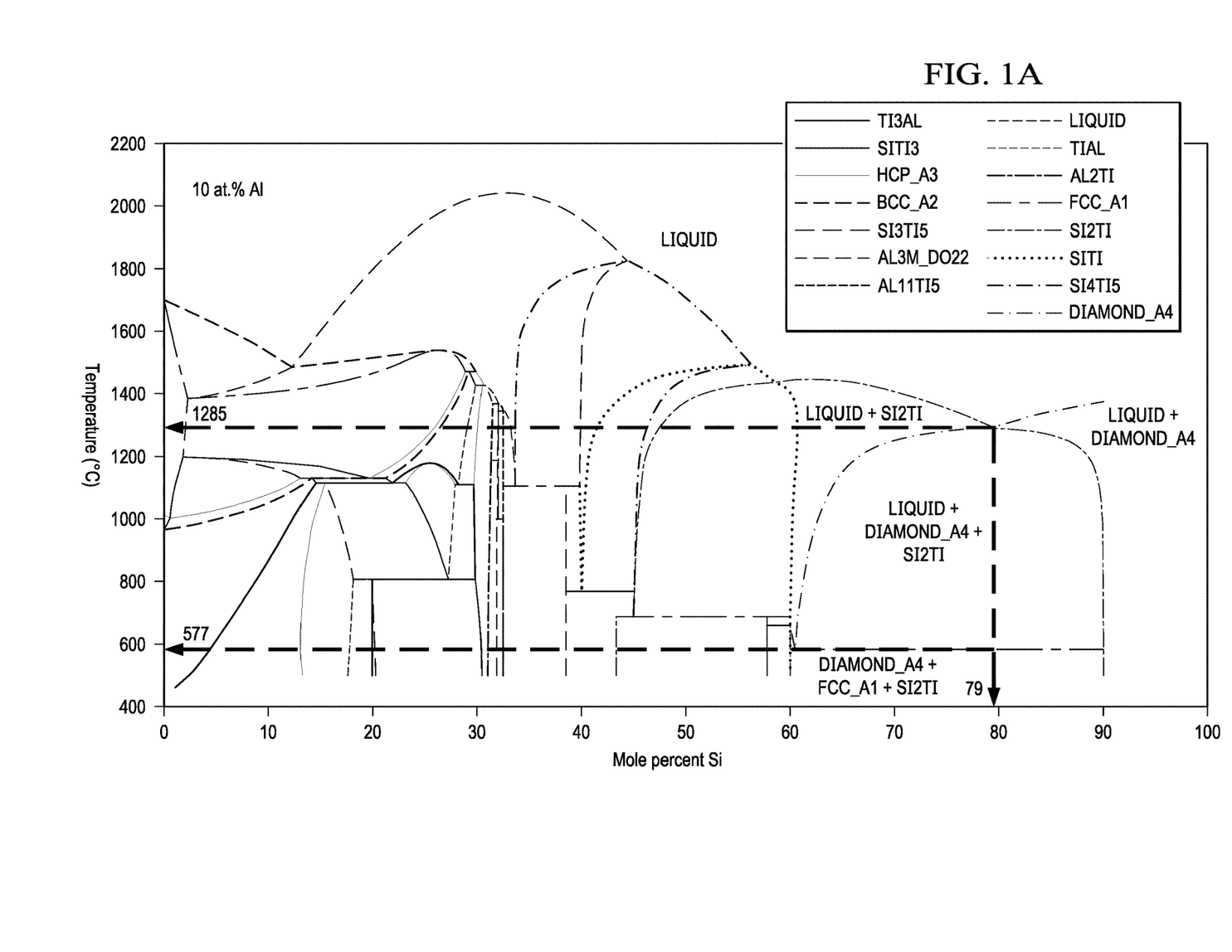
FIGS. 1A-1D are phase diagrams showing the impact of aluminum additions on the silicon-titanium alloy system.
Figure 1B:
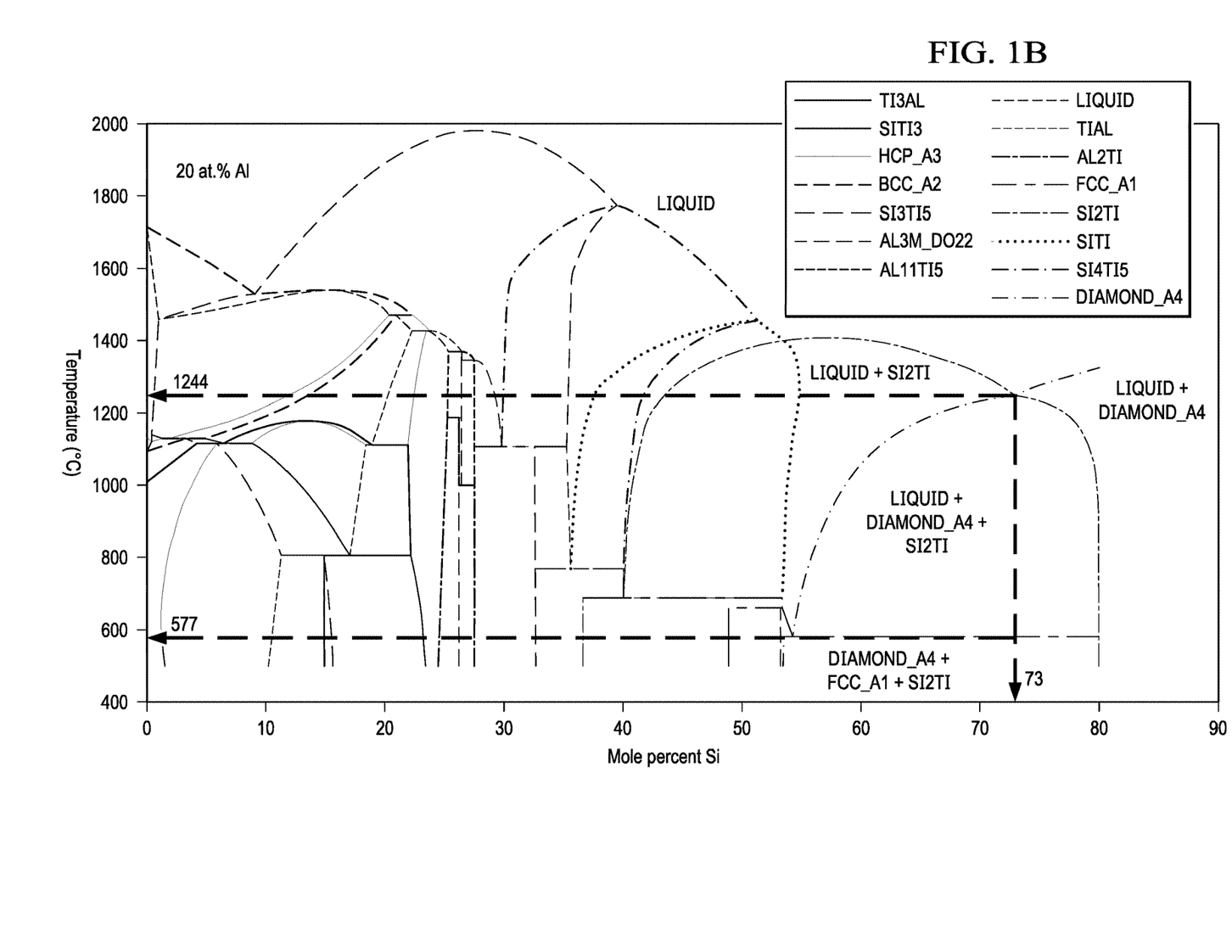
Figure 1C:
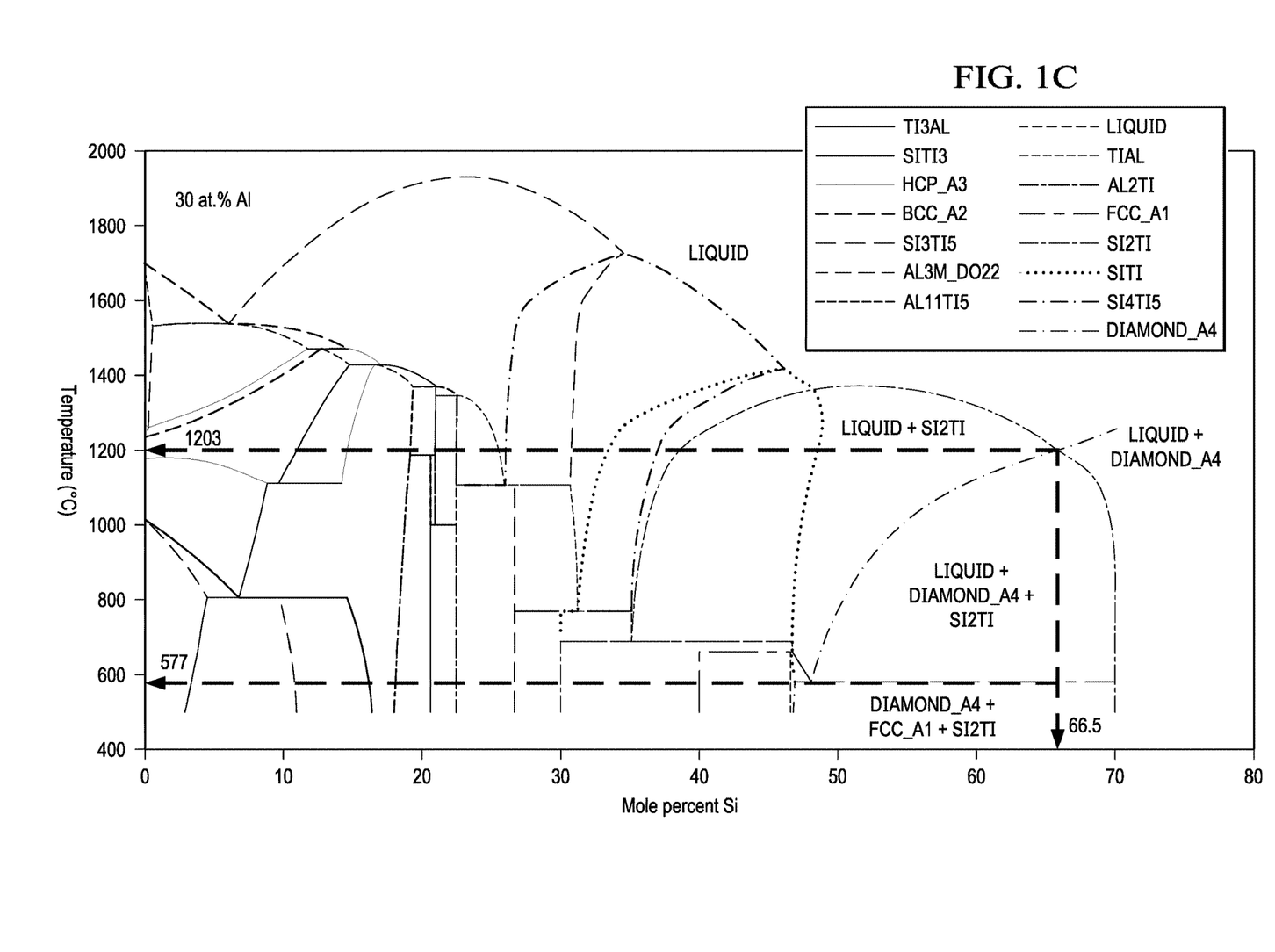
Figure 1D:
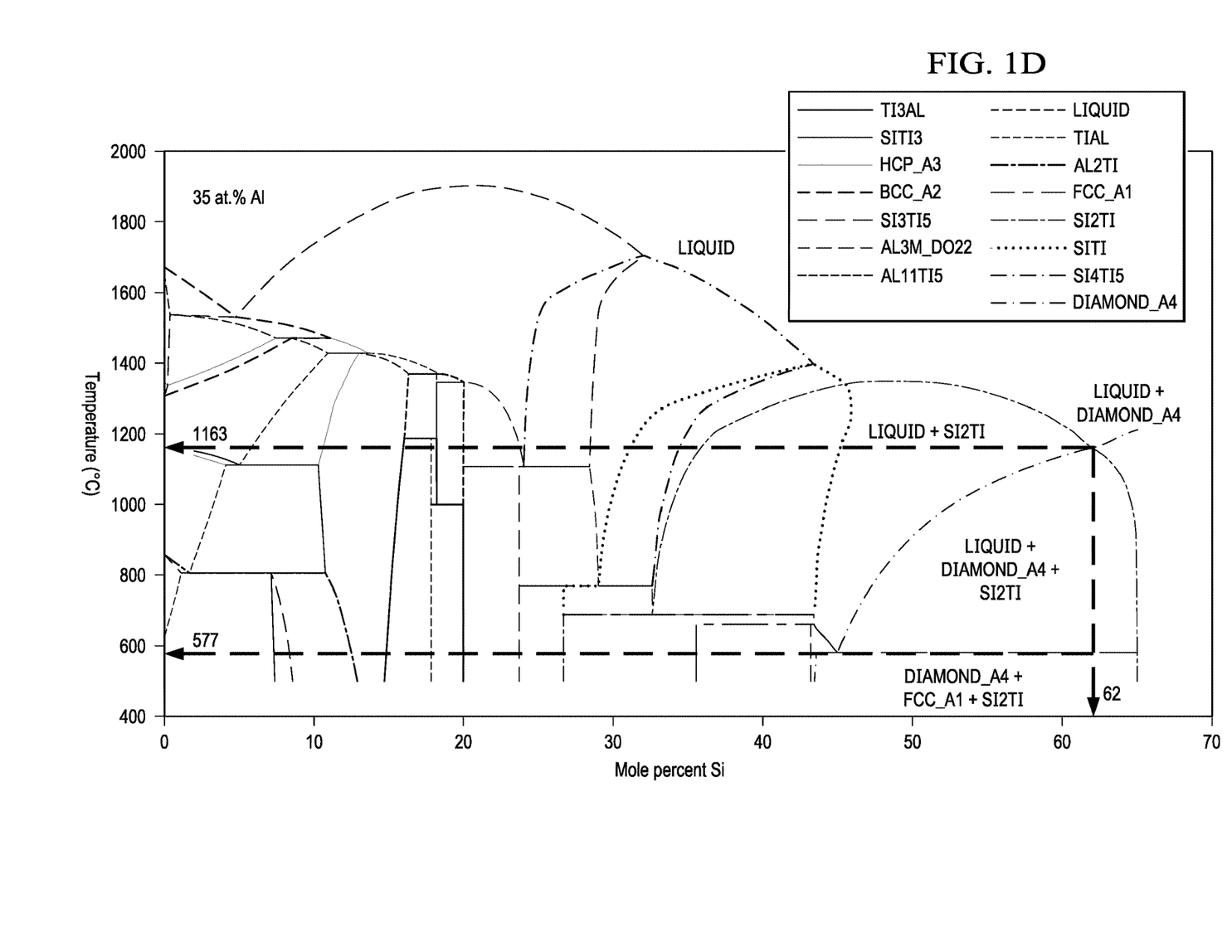
Figure 2A:
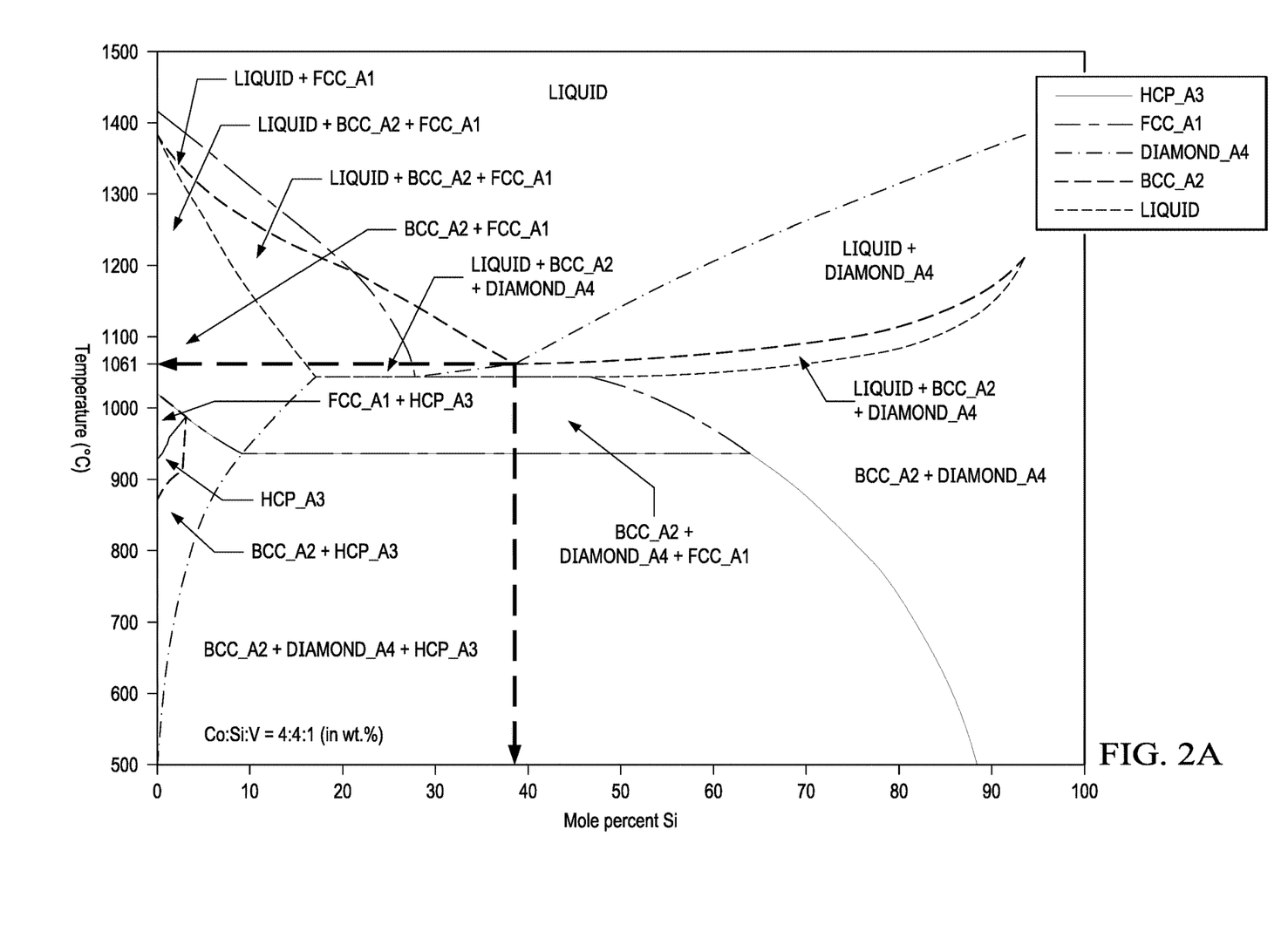
FIGS. 2A-2C are phase diagrams showing the impact of vanadium additions on the silicon-cobalt alloy system.
Figure 2B:
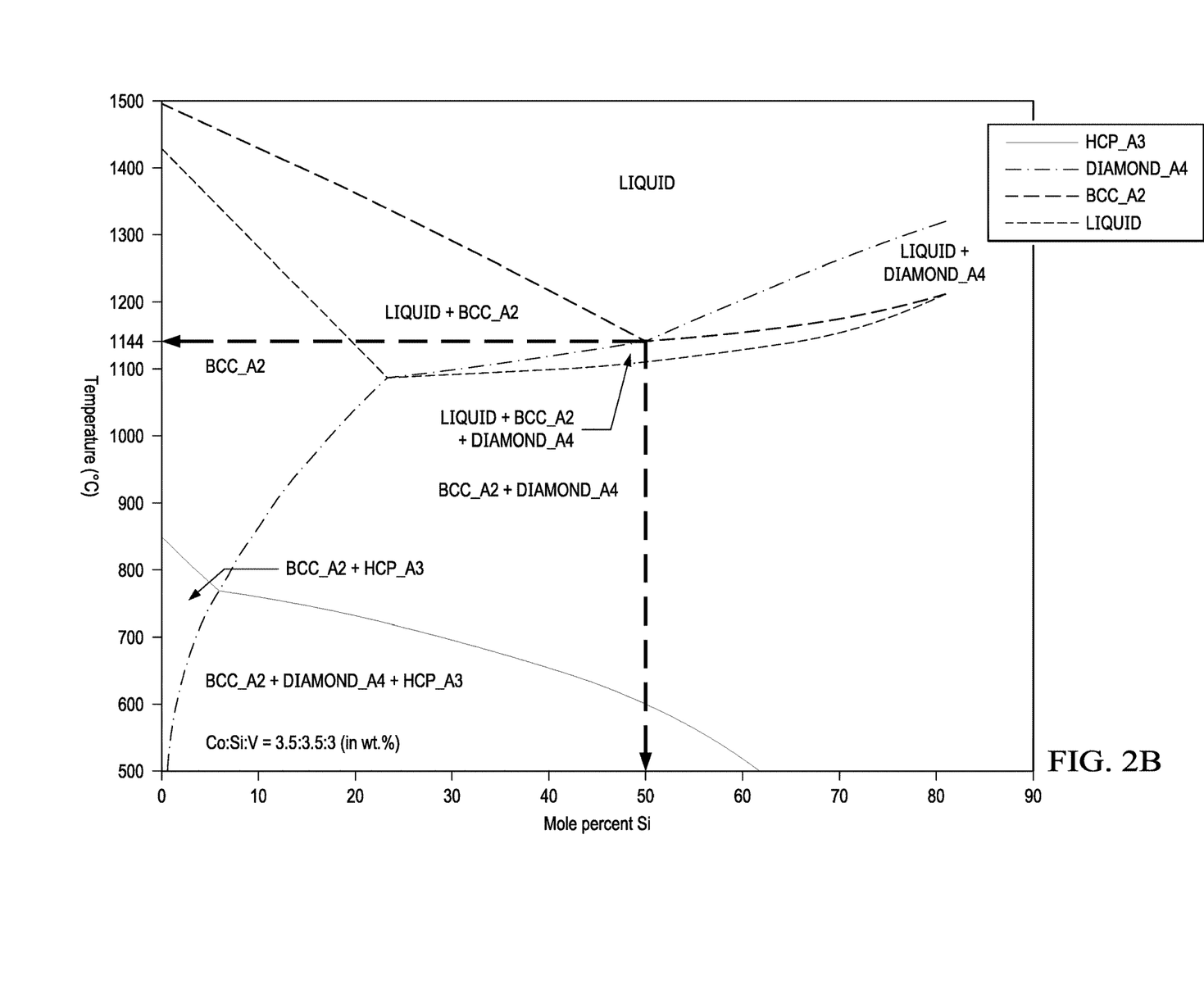
Figure 2C:
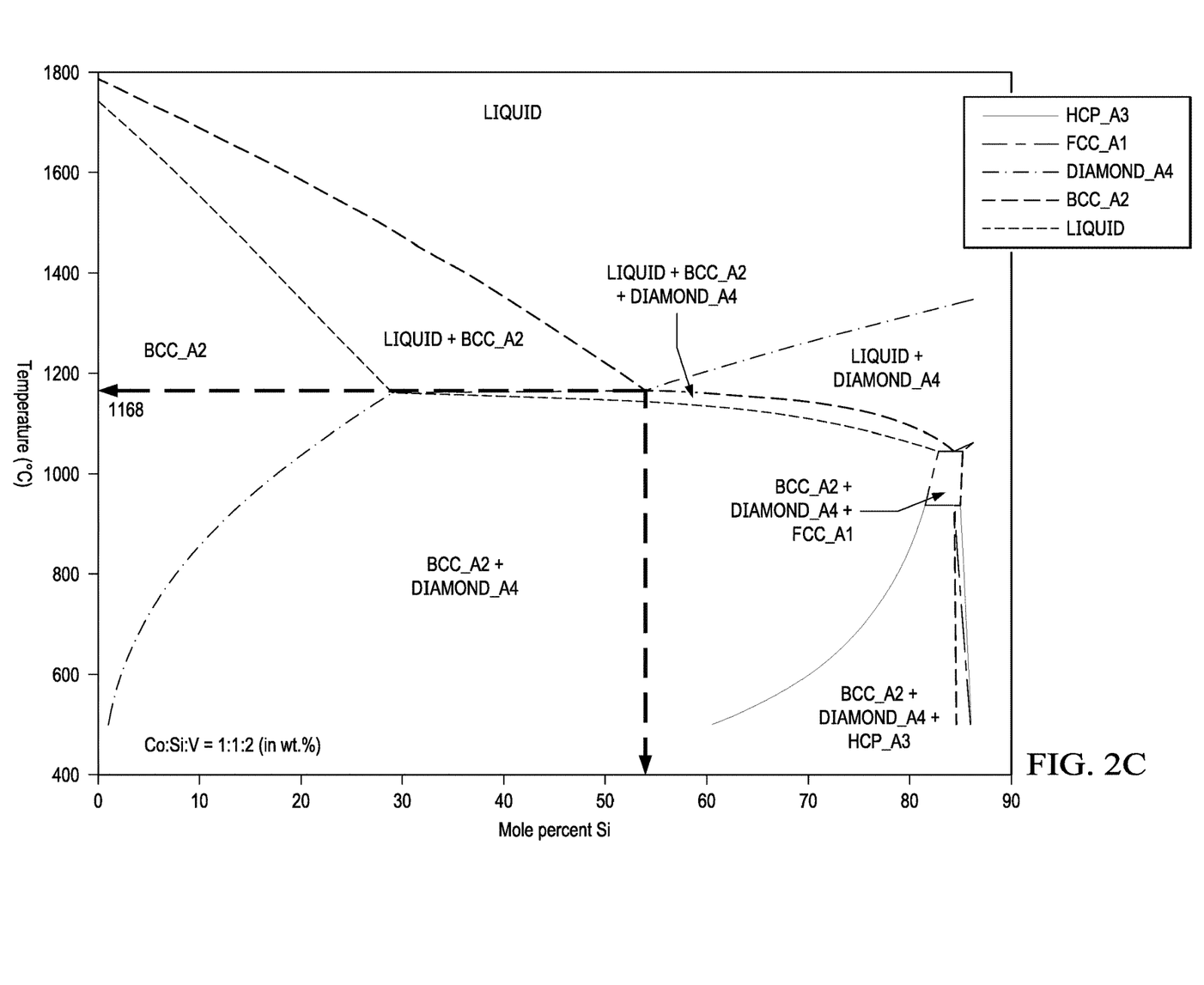
Figure 3A:
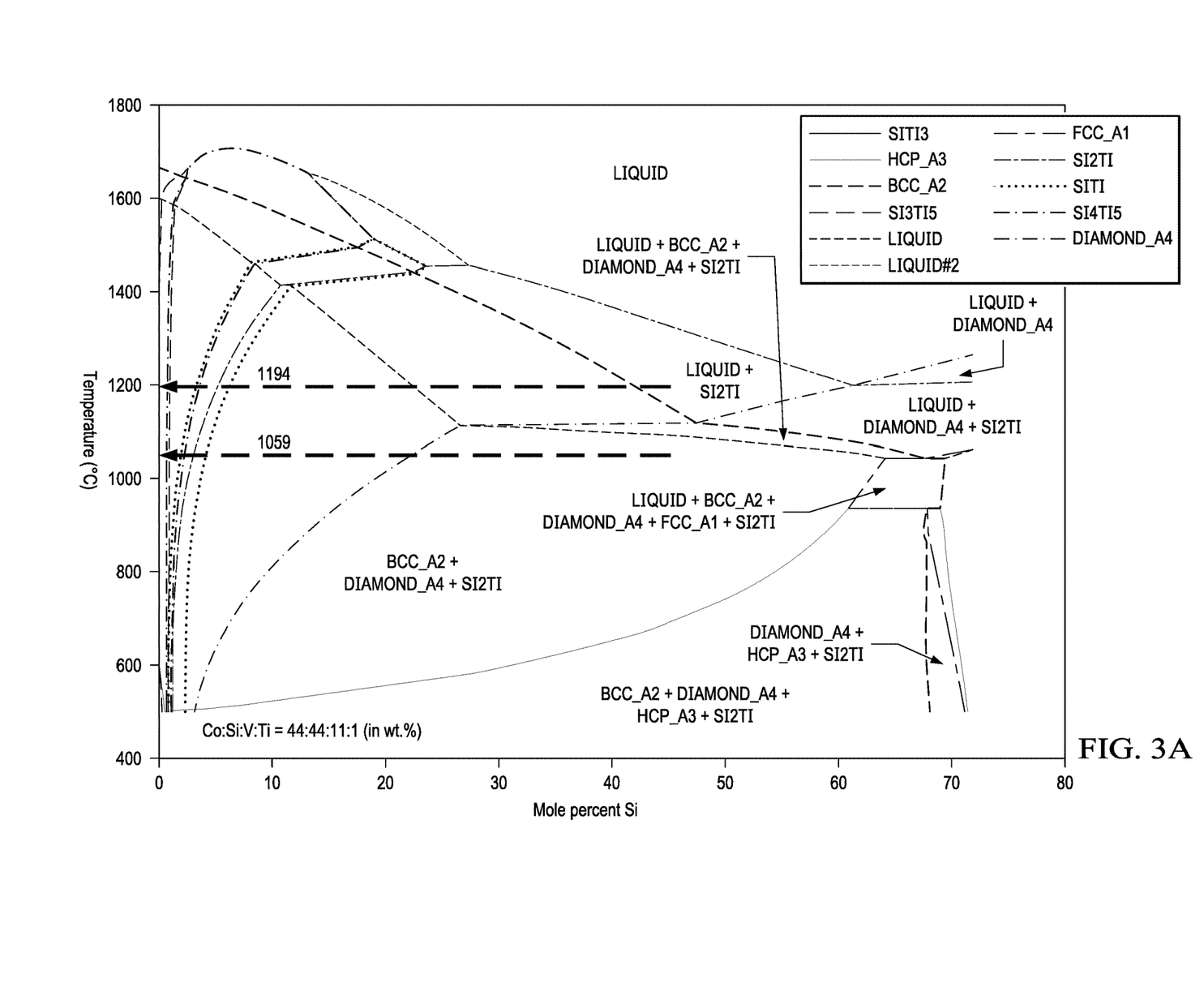
FIGS. 3A-3C are phase diagrams showing the impact of titanium on the silicon-cobalt-vanadium alloy system.
Figure 3B:
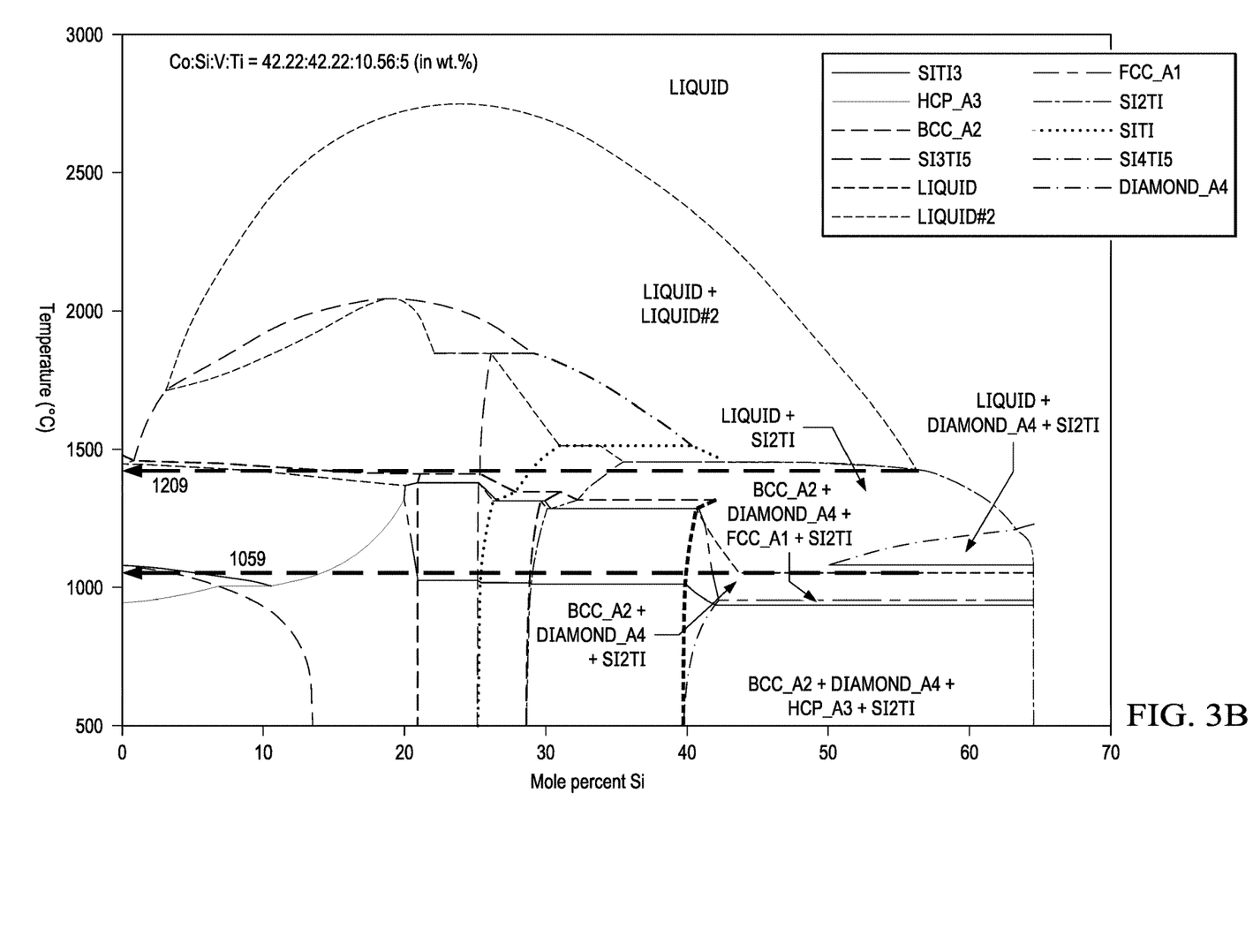
Figure 3C:
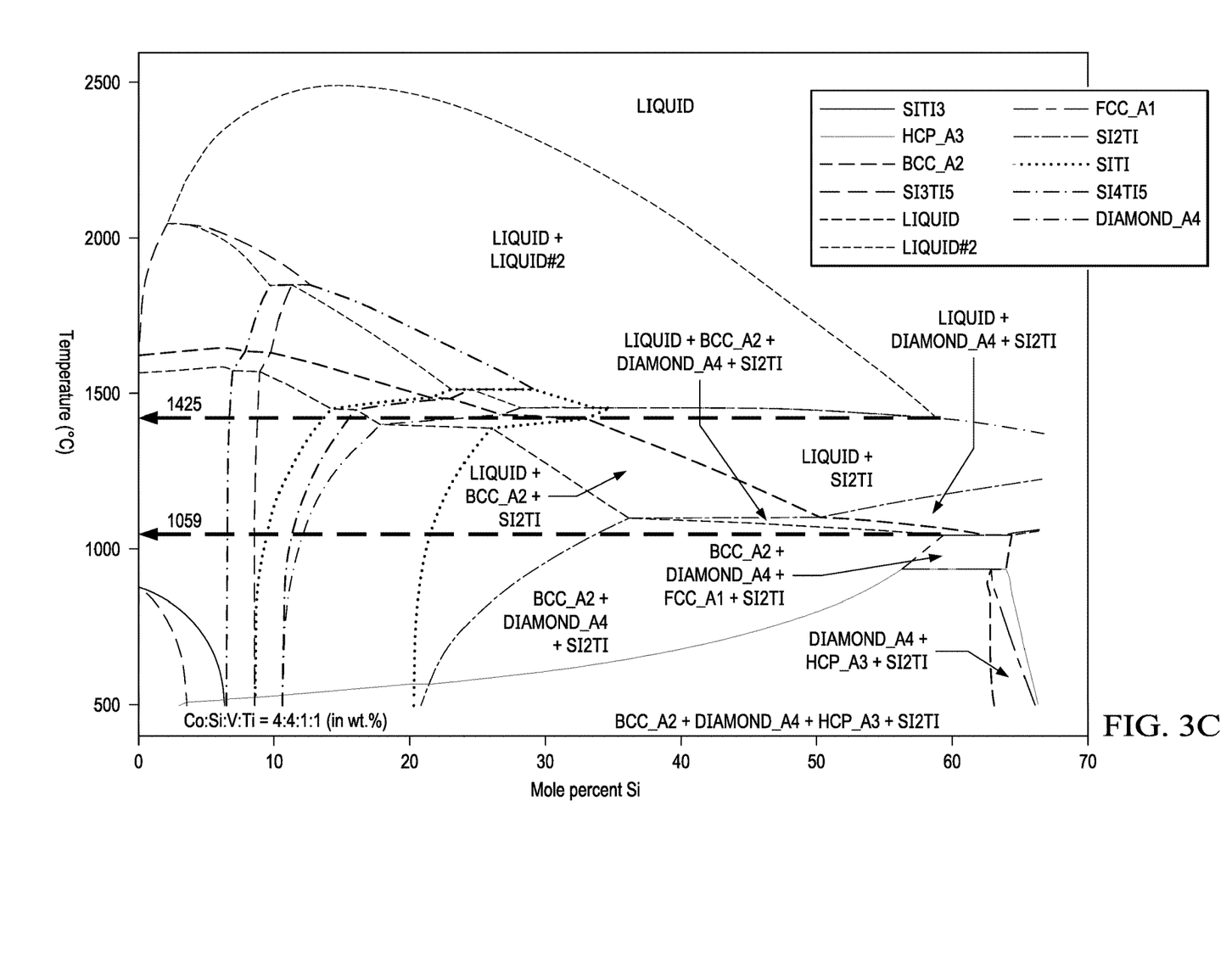

Thermodynamic modeling results for the Si—Co—V system are shown in FIGS. 2A-2C, and for the Si—Co—V—Ti system in FIGS. 3A-3C. By adding 10 wt. %, 30 wt. % and 50 wt. % V into the Co—Si binary system where Co:Si=1:1 (wt. %), the liquidus temperature changes from 1061° C. (10 wt. % V) to 1144° C. (30 wt. % V), and finally reaches 1168° C. (50 wt. % V), as indicated in the phase diagrams of FIGS. 2A-2C, respectively. Thus, a low V concentration (e.g., Co:Si:V=4:4:1) is selected for thermodynamic analysis of a quaternary system including silicon, cobalt, vanadium and titanium. In the Si—Co—V—Ti analysis, Ti is added into the system in amounts of 1 wt. %, 5 wt. % and 10 wt. % as a minor ingredient, and the liquidus changes to 1194° C., 1209° C. and 1425° C., respectively, as shown in the phase diagrams of FIGS. 3A-3C, respectively. Thus, a suitable braze composition is selected to be Si=61 at. %, with Co:Si:V=4:4:1 in wt. %; that is, 43.7Co-43.7Si-10.92V-1.68Ti (in wt. %) or 29Co-61Si-8V-2Ti (in at. %). The thermodynamic analysis shows the presence of Si (diamond), $TiSi_2$, Co—Si solid solution (at low V content) and V—Si solid solution (at low Co content). EDS mapping reveals three main phases in the braze alloy, including $VSi_2$, $CoSi_2$, and silicon. Some Ti-rich areas are also detected using EDS mapping; according to the thermodynamic analysis, the Ti-rich phase may be $TiSi_2$.

SEM and EDS analyses reveal details about the microstructure of the Si—Ti—Ni—Co—Cr system. Several silicides, including $(Ni,Co)Si_2$, $(Ti,Cr)Si_2$ and $Ti_4Ni_4Si_7$, as well as silicon are identified in the braze alloy. At the interface between the braze alloy and the SiC substrate, the $(Ti,Cr)_5Si_3$ phase is found, which has much higher Cr concentration than that of the $(Ti,Cr)Si_2$ phase found in the braze alloy. In the reaction zone, the $(Ni,Co)Si_2$ and $(Ti,Cr)Si_2$ phases are also detected.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A braze alloy for joining or repairing ceramic matrix composite (CMC) components, the braze alloy comprising:
    a braze composition comprising:
        silicon at a concentration from about 48 at. % to about 66 at. %;
        titanium at a concentration from about 1 at. % to about 35 at. %, and
        an additional element selected from the group consisting of: aluminum, cobalt, vanadium, nickel, and chromium,
    wherein the braze composition comprises a melting temperature of less than 1300° C.

2. The braze alloy of claim 1, wherein the melting temperature is less than 1250° C.

3. The braze alloy of claim 1, wherein the braze composition comprises an alloy system selected from the group consisting of: (a) silicon, aluminum and titanium, (b) silicon, cobalt, vanadium and titanium, and (c) silicon, titanium, nickel, cobalt and chromium.

4. The braze alloy of claim 1, wherein the braze composition includes aluminum at a concentration from about 32 at. % to about 36 at. %.

5. The braze alloy of claim 4, wherein the concentration of silicon is from about 60 at. % to about 66 at. % and the concentration of titanium is from about 2 at. % to about 4 at. %.

6. The braze alloy of claim 4, wherein the melting temperature lies in a range from about 1150° C. to about 1185° C.

7. The braze alloy of claim 1, wherein the braze composition includes cobalt at a concentration from about 27 at. % to about 30 at. %.

8. The braze alloy of claim 7, wherein the concentration of silicon is from about 59 at. % to about 63 at. %, and the concentration of titanium is from about 1 at. % to about 3 at. %.

9. The braze alloy of claim 7, wherein the braze composition further comprises vanadium at a concentration of from about 7 at. % to about 10 at. %.

10. The braze alloy of claim 7, wherein the melting temperature lies in a range from about 1225° C. to about 1260° C.

11. The braze alloy of claim 1, wherein the braze composition includes titanium at a concentration from about 29 at. % to about 35 at. %.

12. The braze alloy of claim 11, wherein the braze composition further comprises nickel at a concentration of from 7 at. % to about 11 at. %, cobalt at a concentration of from about 4 at. % to about 6 at. %, and chromium at a concentration of from about 3 at. % to about 6 at. %.

13. The braze alloy of claim 11, wherein the concentration of silicon is from about 48 at. % to about 52 at. %.

14. The braze alloy of claim 11, wherein the melting temperature lies in a range from about 1270° C. to about 1295° C.

15. The braze alloy of claim 1, wherein the braze composition includes, upon brazing, at least one silicide phase.

16. The braze alloy of claim 1, wherein the at least one silicide phase is selected from the group consisting of: $TiSi_2$, $CoSi_2$, $VSi_2$, $(Ni,Co)Si_2$, $(Ti,Cr)Si_2$, and $Ti_4Ni_4Si_7$.

* * * * *